United States Patent [19]
Wilkison, III et al.

[11] Patent Number: 5,477,810
[45] Date of Patent: Dec. 26, 1995

[54] AVIARY AIR FILTER

[76] Inventors: Ralph C. Wilkison, III, 2707 Heidelback Ave., Evansville, Ind. 47711; Alan W. Jordan, 413 W. Louisana, Evansville, Ind. 47710

[21] Appl. No.: 272,089

[22] Filed: Jul. 8, 1994

Related U.S. Application Data

[63] Continuation-in-part of Ser. No. 9,924, Jun. 24, 1993, Pat. No. Des. 353,884.

[51] Int. Cl.$^6$ ............................................. A01K 31/06
[52] U.S. Cl. .......................................................... 119/17
[58] Field of Search .................................... 119/15, 17

[56] References Cited

U.S. PATENT DOCUMENTS

| | | | |
|---|---|---|---|
| 3,557,756 | 1/1971 | Ramsey | 119/15 |
| 3,630,174 | 12/1971 | Runkle et al. | 119/15 |
| 3,877,420 | 4/1975 | Eagleson, Jr. | 119/15 |
| 4,023,529 | 5/1977 | Laudy | 119/15 |
| 4,249,482 | 1/1989 | Harr | 119/17 |
| 4,343,261 | 8/1982 | Thomas | 119/15 |
| 4,788,939 | 12/1988 | Peters | 119/17 |
| 4,798,171 | 1/1989 | Peters et al. | 119/15 |
| 5,134,972 | 8/1992 | Compagnucci | 119/17 X |
| 5,148,766 | 9/1992 | Coiro, Sr. et al. | 119/17 |
| 5,188,646 | 2/1993 | Nolen, Jr. | 55/486 X |
| 5,236,476 | 8/1993 | Klick | 55/212 |

*Primary Examiner*—Robert P. Swiatek
*Attorney, Agent, or Firm*—Middleton & Reutlinger; David W. Carrithers

[57] ABSTRACT

A self contained aviary air filter apparatus removably mounted to a cage utilizing a forced air system and removable filter cartridge arrangement for removing particular matter such as dander from the bird cages by developing a negative pressure in the bottom of the cage minimizing draft by providing a directional scoop air intake for directing dander containing air through one or more stages of filters at a high flowrate to maximize throughput.

17 Claims, 4 Drawing Sheets

AVIARY AIR FILTER

This application is a continuation-in-part of Ser. No. 29/009,924, filed Jun. 24, 1993, and now U.S. Pat. No. D353,884.

BACKGROUND OF THE INVENTION

Commercial aviaries or bird cages are used for providing a habitat for small and/or large birds which produce dander or other small animals which create particular matter in an enclosed environment. The dander decreases the quality of air for the animals and is an environmental and sanitary problem because the dander is difficult to clean and remove from the cages and the surrounding area making frequent dusting and cleaning necessary. Commercial air filters typically utilize conventional large capacity air ducts which do not tend to direct the air or concentrate the particular matter before entry to the filter as does the present invention. Moreover, the conventional air filter assemblies known pull air from the top of the cage to move the dander and particulate matter upward against the force of gravity thereby requiring a larger quantity of air to moved at a greater velocity and distance to effectively clean the same amount of area as can be cleaned by a smaller unit as shown and claimed in the present invention which may attached to the cage near the bottom.

SUMMARY OF THE INVENTION

The present invention solves the dander problem utilizing a stand alone or integral air filter unit whereby air is drawn into a filtering unit by way of a collector mounted on a cage, or designed as an integral part of the cage. Air flows into the collector or is sucked in the collector via a fan in fluid communication therewith which forms a negative pressure area that extends across the cage at a low point minimizing convention currents throughout the cage. The dander saturated air is sucked into a directional scoop concentrating the particular matter through a much smaller and restricted intake conduit formed by the housing panels which increases the velocity of the air via a venturi effect just as the air is pulled through removable filter cartridges by a blower, thereby increasing the effectiveness of the filter(s).

More particularly, the present invention comprises an aviary air filter assembly including an air circulation housing having a rear panel having an opening therein connecting a bottom panel and a top panel, an end panel connected to the rear panel, the bottom panel, and the top panel, and a short front panel extending from the end of the housing opposite the end panel connecting the bottom panel and the top panel. A scoop for directing air flow having a straight end and a curved end is disposed within the housing. The curved end of the scoop is contiguous with the outer edge of the end panel and the straight end is contiguous with the interior surface of the rear panel. The aviary air filter assembly includes a means for recirculating air disposed within the housing such as an electric or battery operated blower or fan located opposite the end panel of the housing. A means for movably mounting the housing to a cage such as with hooks adapted to engage a horizontal rod of the cage is attached to the housing. Futhermore, a filter cartridge removably disposed in the housing is in fluid communication with means for recirculating air. The filter cartridge contains at least one filter element therein depending upon the number of desired stages of filtration.

Therefore, it is an object of the present invention to provide an integral aviary filter assembly adaptable for mounting on individual bird cages.

It is another object of the present invention to provide a removable filter cartridge assembly for easy maintainance and inexpensive changing and selection of the filters.

It is another object of the present invention to utilize an electrostatic filter in combination with a prefilter fiber filter in a cage filter.

It an object of the present invention to provide a means for creating negative pressure in the lower region of the cage to assist in the removal of dander without creating drafts resulting from a high airflow rate by using a scoop assembly in combination for directing air having a low flow rate into the filter wherein the velocity of the air is increased through the restricted area creating a venturi effect increasing the efficiency of the filters.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

Figure 1:
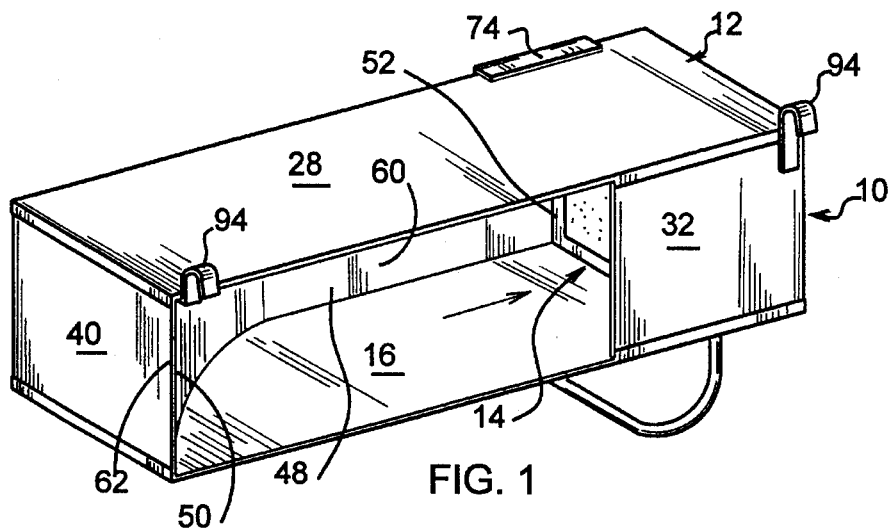
FIG. 1 is a perspective view of an aviary air filter made in accordance with my design.
Figure 2:
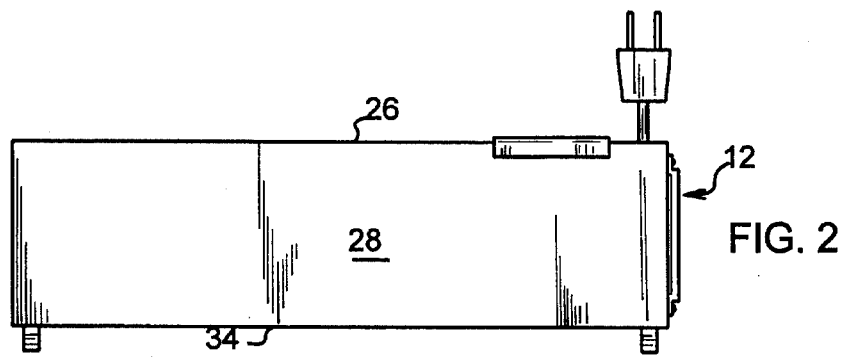
FIG. 2 is a top plan view thereof.
Figure 3:
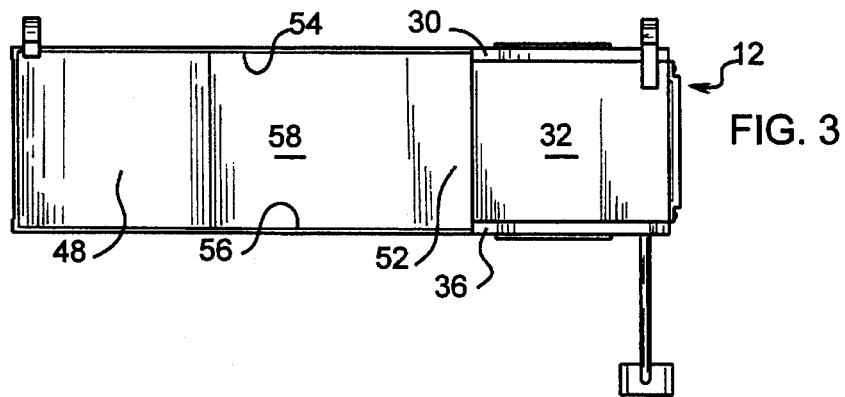
FIG. 3 is front elevational view thereof.
Figure 4:
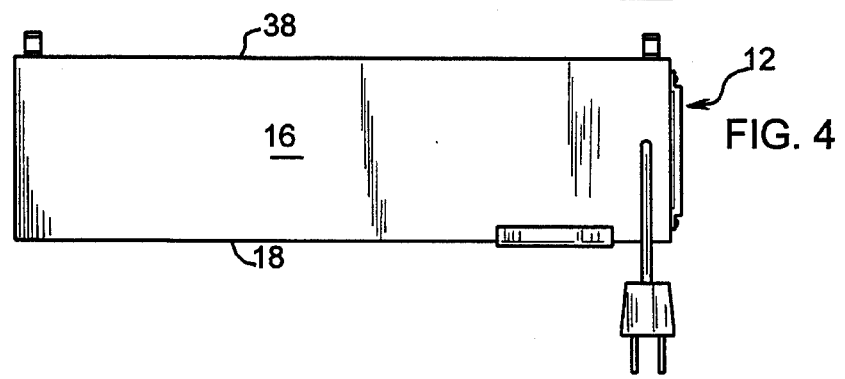
FIG. 4 is bottom plan view thereof.
Figure 5:
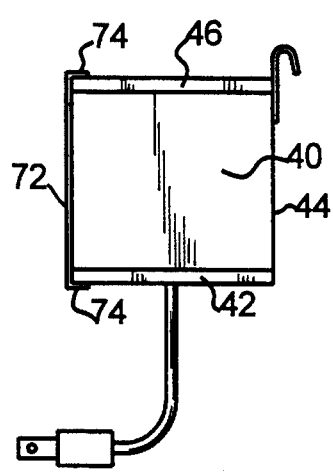
FIG. 5 is an end elevational view thereof.

The aviary air filter assembly 10 of the present invention is manufactured from readily available materials and simple in design. The housing assembly 12 of the preferred embodiment is comprised of metal, more particularly sheet metal comprising steel or aluminum; however, it is contemplated that plastic or other polymer composite materials could be used in combination with or substituted for the metal components of the present invention.

Referring now to the drawings, FIGS. 1–16 show the preferred embodiment of the integral aviary air filter 10 for individual cages. FIGS. 1–9 show the exterior features of the aviary air filter 10 and FIGS. 10–16 are directed toward the construction of the aviary air filter housing 12 and filter cartridge 14.

As best shown in FIGS. 1–9, the longitudinal air circulation housing 12 has a generally rectangular cross-sectional view; however, it is contemplated that the external appearance may have a square or rounded exterior shape. The housing 12 comprises a bottom panel 16 having a back edge 18 connected to the lower edge 20 of a rear panel 22, wherein the upper edge 24 of back panel 22 is connected to the rear edge 26 of a top panel 28; the top edge 30 of a short front panel 32 is connected to the front edge 34 of the top panel 28; the lower edge 36 of the front panel 32 is connected to the front edge 38 of the bottom panel 16; an end panel 40 located on the end opposite the short front panel 32 is attached to bottom panel 16 by bottom end edge 42, attached to rear panel 22 by rear end edge 44, and attached to top panel 28 by top end edge 46. Of course, it is contemplated that the housing 12 could be fabricated or molded as a one piece assembly.

A scoop 48 for directing air flow is comprised of a long strip of material, metal or plastic, curved on one end defining a first curved end edge 50, a second straight end edge 52, a top edge 54, a bottom edge 56, an interior surface 58, and exterior surface 60 (not shown). The substantially flat, longitudinal scoop 48 is disposed within the air circulation housing 12 wherein the first curved end edge 50 of the scoop 48 is attached to and is contiguous with the front edge 62 of the first end panel 40 as shown best in FIGS. 1 and 9. The curved portion of the scoop 48 curves outwardly from the rear panel 22 to the first end panel 40, and the straight end portion of the scoop 48 extends to and intersects with the interior surface of rear panel 22. The scoop 48 is placed within the housing 12 so that the exterior surface 60 of the scoop is contiguous with the rear panel 22. The scoop 48 is sized so that the top edge 54 is contiguous with the top panel 28 and the bottom edge 56 of the scoop 48 is contiguous with the bottom panel 16. The second straight end edge 52 is disposed against a filter cartridge assembly 14 positioned within the housing 12 opposite the first end panel 40 providing a air tight seal therebetween.

Figure 8:
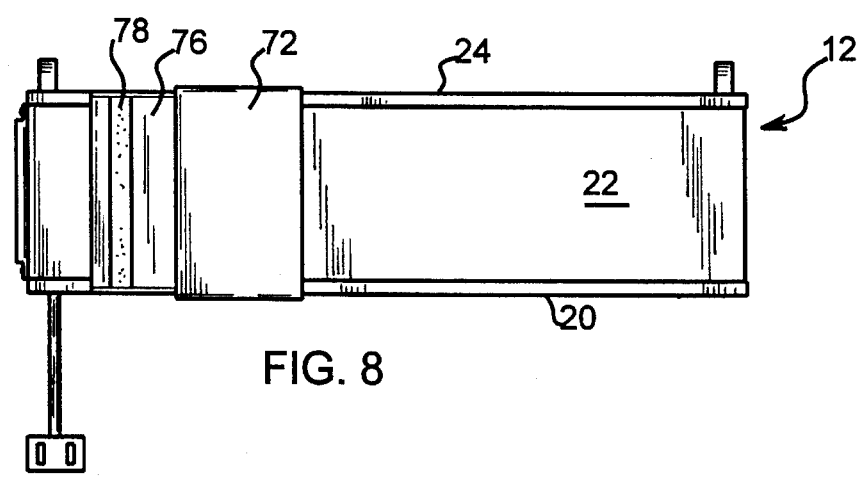
FIG. 8 is an alternate rear elevational view thereof.

As best shown in FIGS. 9–15, the filter cartridge assembly 14 comprises at least one filter element 64 or pad, held within a frame 66 therein. The filter cartridge 68 is fabricated from metal or plastic strips 70 connected together at their ends or a single strip 70 wrapped around the peripheral edges of the filter pad(s) 64. The outer edges of the strips 70 are bent inwardly at about a ninety degree angle around the filter pad(s) 64 to hold the pad(s) 64 into position. A panel cover 72 is attached to one side of the filter cartridge 68, with holding means such as screws or rivets. The edges of the cover 72 extends outwardly pass the filter cartridge 68. The cover 72 includes a pair of flanges 74, spaced away from and extending perpendicular from the cover 72 inwardly toward the filter cartridge 68. The filter cartridge 68 is inserted into the housing 12 through an opening 76 formed in the rear panel 22 of the housing 12. The cover 72 overlaps the edges of the opening 76 formed in the rear panel 22 forming an air tight seal thereby. The flanges 74 overlap and are in slidable communication with a portion of the top panel 28 and bottom panel 16 providing a friction fit for holding the filter cartridge assembly 14 in position. As shown in FIG. 8, a strip of sealing and/or insulating material 78, such as foam rubber, comprising a pliable strip is disposed within the opening 76 of the preferred embodiment and affixed to the interior surfaces of the bottom panel 16, to panel 28, and front panel 32, wherein the insulating/sealing strip 78 lies disposed between the panels and the cartridge frame 68 to provide an air tight seal and reduce noise associated with vibration. Thus, the filter cartridge assembly 14 is held in position enclosed within the housing 12 opposite the end panel 40, whereby the sides of the filter cartridge 68 form an air tight seal with the interior surfaces of the bottom panel 16, rear panel 20, top panel 28, and front panel 32.

Figure 10:
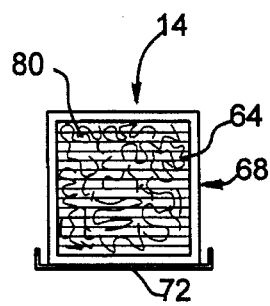
FIG. 10 is a front view of the filter cartridge assembly.
Figure 11:
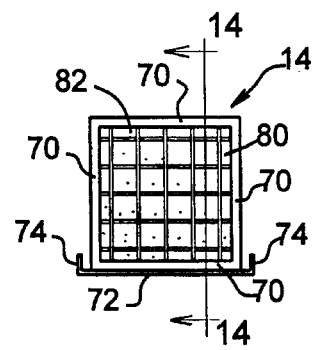
FIG. 11 is a rear view of the filter cartridge assembly.
Figure 12:
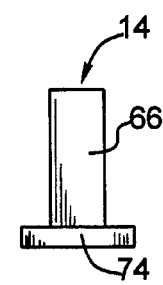
FIG. 12 is a side view of the filter cartridge assembly.
Figure 13:
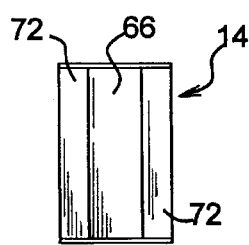
FIG. 13 is a top view showing the filter cartridge and cover.
Figure 9:
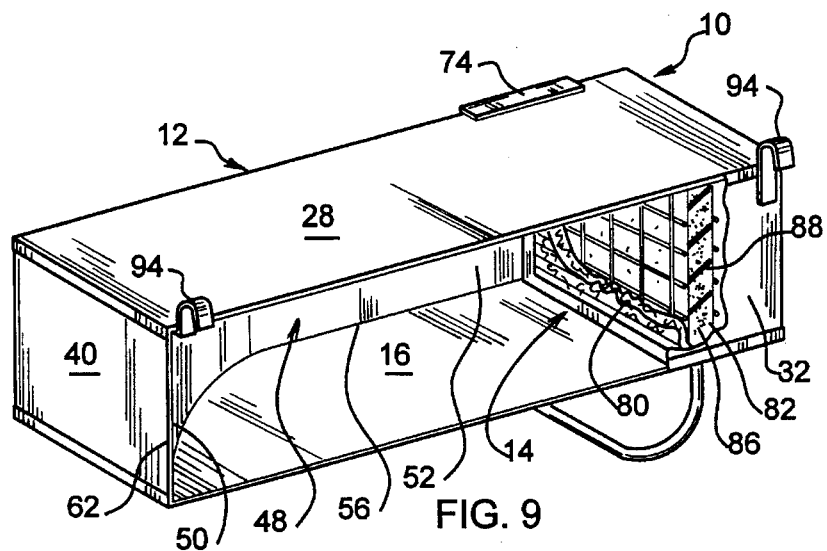
FIG. 9 is a perspective view of the aviary filter assembly of the present invention showing a cutaway view of the filter cartridge assembly within the housing.
Figure 14:
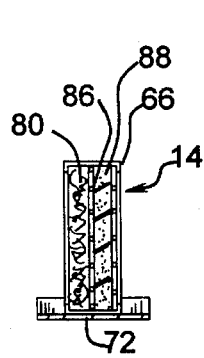
FIG. 14 is a sectional side view of FIG. 11 showing the filter pads and filter cartridge.
Figure 15:
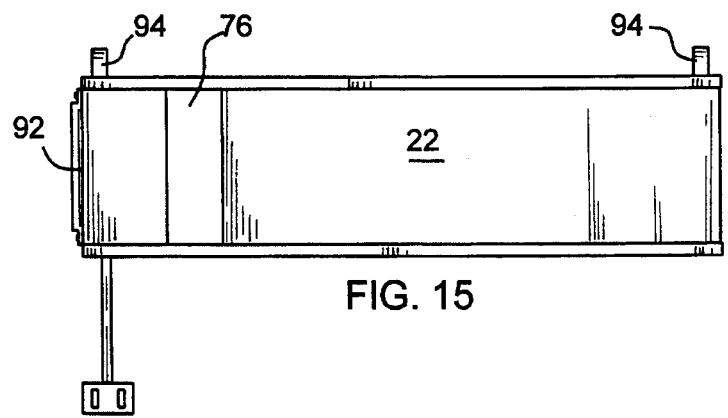
FIG. 15 is a rear view of the present invention showing the mounting means an opening for insertion of the filter cartridge assembly.

More particularly, the filter cartridge assembly 14 of the preferred embodiment is a multi-stage unit utilizing a first or primary filter pad element 80 comprising a loosely woven fibrous material composed of natural and/or a synthetic fiber or combination thereof approximately one inch thick. Typically material such as used in the manufacture of conventional furnace filters composed of one inch "hog hair" type fibers is used as a first stage prefilter 80 for removing down, feathers and larger particular matter as shown in FIGS. 9 and 10. The filter cartridge assembly of the preferred embodiment also uses a secondary filter pad element 82 comprising an electrostatic filter (filter having an electrostatic charge associated therewith) in combination with the primary filter 80 to remove very small particles of dust and pollen, etc. As shown in FIGS. 9, 11, and 14, an electrostatic filter pad 82 comprises a layer of porous foam of about ¼ inches in thickness sandwiched between two pieces of electrostatic weave or mesh 86, such as AIR MEDIC PLUS™ providing an antimicrobial system with 94% arrestance, and is held together in a filter frame 66 such as described in U.S. Pat. No. 5,188,646 by Nolan, Jr. for an "Adjustable Air Filter", issued Feb. 23, 1993. A charcoal filter may be employed as third stage or tertiary filter 88 held within mesh container or other holding means in a frame to remove odors associated with the filtered waste products. Of course, it is contemplated that additional filters of various types and configurations may be utilized depending upon the filtration required for a particular application or environment desired. Finally, a wetting agent or liquid adhesive spray 90 such as the water soluble spray, FILTER PLUS™, produced by Air-Kontrol, Inc., Batesville, MS, may be applied to the primary filter 80 to improve the performance and efficiency thereof and help to trap particles.

Figure 6:
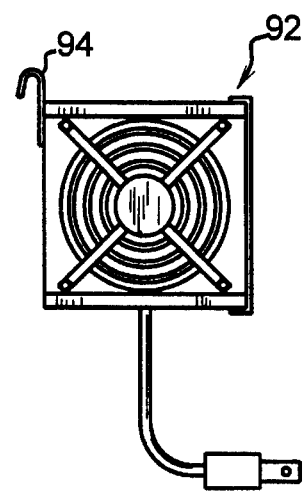
FIG. 6 is an opposite end elevational view thereof.
Figure 7:
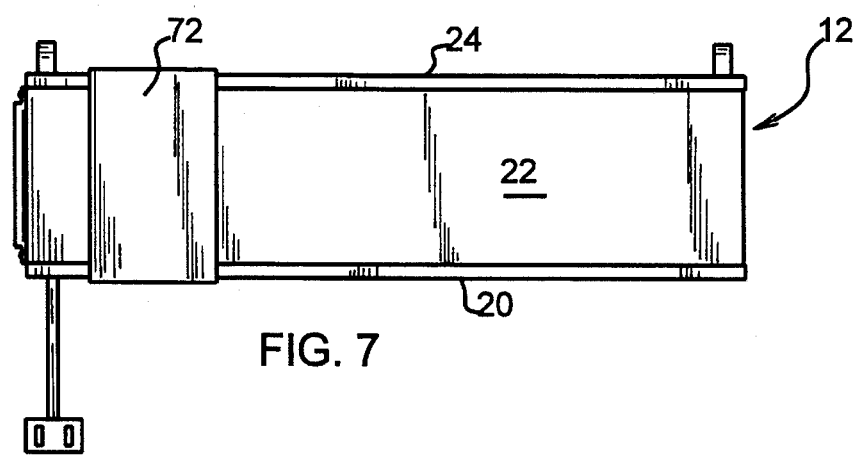
FIG. 7 is a rear elevational view thereof.

FIG. 6 shows that the aviary air filter 10 includes an air moving means such as a blower 92 which comprises an electric fan for sucking the dander saturated air through the filter assembly 14. Most important, the fan 92 forms a negative pressure area that extends across the cage at a low point utilizing gravity to improve performance and minimizing disturbance to the birds which usually roost on perches above the floor of the cage. The blower 92 is enclosed within the end of the housing 12 opposite end panel 40. The preferred embodiment uses an electric motor; however, it is anticipated that a battery operated motor may be used for transporting birds.

Figure 16:
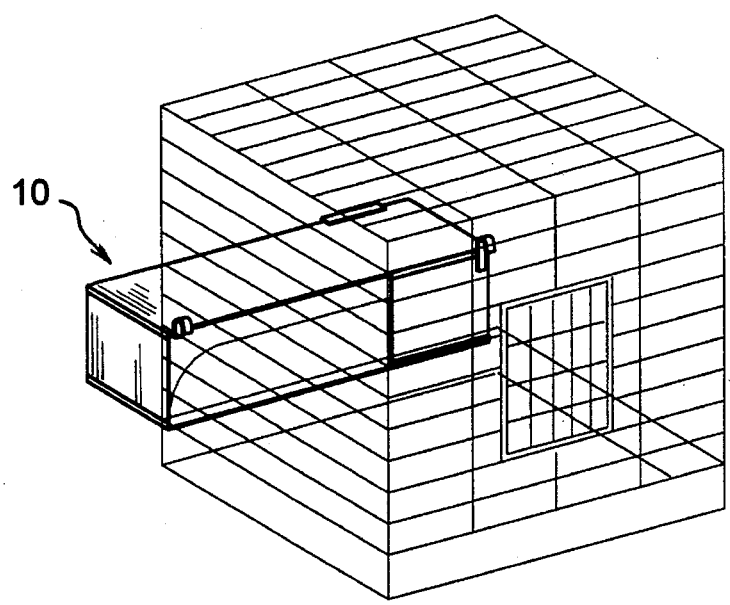
FIG. 16 is a perspective view showing the integral aviary filter assembly mounted to a cage.

As shown in FIGS. 1, 9, and 16, a means for removably mounting the aviary air filter 10 to the cage consists of simple hooks which may be cooperatively engaged with the rods forming the cage structure. Of course, any type of holding means can be utilized to hold the aviary air filter 10 in close proximity to the cage such as is shown in FIG. 16.

A novel feature of the preferred embodiment of the present invention is the ability to provide aviary air filters 10 for individual open air cages having a plurality of disposable filter options which are easy to change and inexpensive to manufacture. The novel scoop 48 provides a means for collecting dander over a large surface area, whereby the scoop 48 and/or entire aviary air filter 10 can extend across the entire width of the cage and remove dander saturated air from the bottom of the cage minimizing convection currents or other drafts capable of disturbing or harming the birds, directing the air through a plurality of filters forming a filter pack having particular properties. Moreover, the dander saturated air sucked through and concentrated passing through the restricted opening formed between the housing panels, 16, 22, 28, and 32 respectively, enclosing the filter cartridge 14 increases the velocity of the air at the point where the dander saturated air is pulled through the filter cartridge 68 creating a venturi effect which greatly improves the filtering capability of the filter cartridge 68 without causing a draft within the cage. The design of the directional scoop 48 results in the removal of dander saturated air from the cage creating a negative pressure area that extends across the cage at a low point around the aviary air filter scoop 48 minimizing convention currents throughout the cage. Thus, The dander saturated air is sucked into a directional scoop concentrating the particular matter through a much smaller and restricted intake conduit formed by the housing panels which increases the velocity of the air via a venturi effect just as the air is pulled through removable filter cartridges by a blower, thereby increasing the effectiveness of the filter(s).

Figure 17:
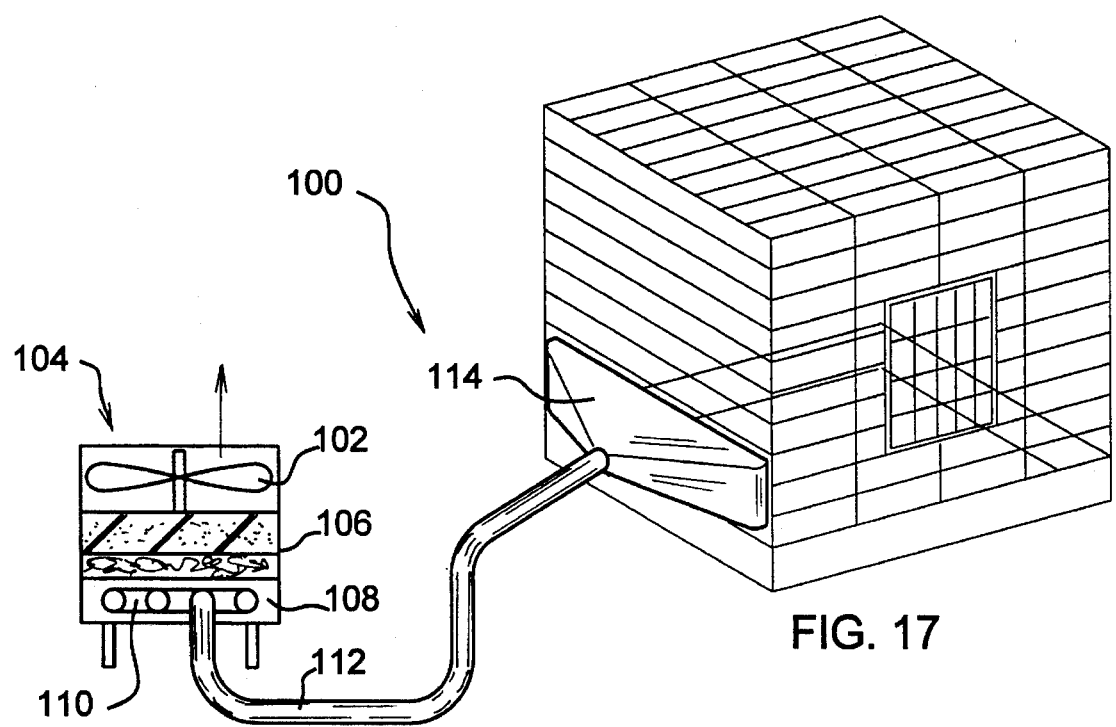
FIG. 17 is a perspective view showing an alternate embodiment of the aviary air filter system utilizing a floor housing having a removable filter cartridge adapted to provide filtering for several different cages and having a collector for each cage in fluid connection with a manifold and plenum assembly.

An alternate embodiment, utilizes a floor avian air filter assembly 100 as shown in FIG. 17. One or more blowers 102 are held within a housing 104 containing a removable vertical multistage filter pack 106 such as described heretofore comprising a plurality of filter elements 106 of varying degrees. Below the filter pack 106 the housing 104 forms a plenum 108 branching into a manifold 110 having a plurality of air conduit connections 112 associated therewith. Each conduit 112 may be connected to individual cages, wherein individual collectors 114 pull the dander saturated air from the cages in much the same manner as the integral aviary air filters 10. Air flows into the collector 114 or is sucked in the collector via a fan in fluid communication therewith which forms a negative pressure area that extends across the cage at a low point around the aviary air filter scoop 48 minimizing convention currents throughout the cage. As in the integral aviary air filter 10 design, the scoop 48 serves to concentrate the dander and direct it into a filter at an increased flow rate improving the efficiency of the filter elements 64.

Furthermore, it is contemplated that the claimed invention described herein may be utilized for enclosures for other animals in addition to birds.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. An aviary air filter assembly for direct mounting to a cage, comprising:

an air circulation housing having a rear panel connecting a bottom panel and a top panel, an end panel connected to said rear panel, said bottom panel, and said top panel, and a short front panel extending from the end of said housing opposite said end panel, said short front panel connecting said bottom panel and said top panel;

a scoop for directing air flow, said scoop having a straight end and a curved end, said scoop being disposed within said housing, said curved end being contiguous with the outer edge of said end panel and said straight end being contiguous with the interior surface of said rear panel;

means for recirculating air disposed within said housing opposite said end panel;

means for movably mounting said housing to a cage;

removable means for filtering air disposed in said housing in fluid communication with said means for recirculation air.

2. The aviary air filter assembly of claim 1, wherein said means for recirculating air is an electric blower.

3. The aviary air filter assembly of claim 1, wherein said means for recirculating air is a battery operated blower.

4. The aviary air filter assembly of claim 1, wherein said means for movably mounting said housing to a cage is at least one hook adaptable to engage the support rods of the cage.

5. The aviary air filter assembly of claim 1, wherein said removable means for filtering air comprises a filter cartridge containing at least one filter pad element removably disposed in said housing.

6. The aviary air filter assembly of claim 5, said rear panel of said housing having an opening therein for insertion of said filter cartridge.

7. The aviary air filter assembly of claim 5, wherein said filter pad element comprises a loosely woven fibrous material composed of natural and/or a synthetic fiber or combination thereof.

8. The aviary air filter assembly of claim 5, wherein said filter pad element comprises an electrostatic filter for removing very small particles of dust and pollen.

9. The aviary air filter assembly of claim 5, wherein said filter pad element comprises a charcoal filter.

10. The aviary air filter assembly of claim 5, wherein said filter pad cartridge consists of filter elements selected from the group consisting of loosely woven fibrous material composed of natural and/or a synthetic fiber, an electrostatic filter, a charcoal filter, or combinations thereof.

11. The aviary air filter assembly of claim 5, including a wetting agent being applied to said loosely woven fibrous material.

12. The aviary air filter assembly of claim 5, wherein said housing is molded as a one piece assembly.

13. An air filter assembly for attachment to an animal cage, comprising:

an air circulation housing having a rear panel connecting a bottom panel and a top panel, an end panel connected to said rear panel, said bottom panel, and said top panel, and a short front panel extending from the end of said housing opposite said end panel, said short front panel connecting said bottom panel and said top panel;

a scoop for directing air flow, said scoop having a straight end and a curved end, said scoop being disposed within said housing, said curved end being contiguous with the outer edge of said end panel and said straight end being contiguous with the interior surface of said rear panel;

means for recirculating air disposed within said housing opposite said end panel;

means for movably mounting said housing to a cage;

removable means for filtering air disposed in said housing in fluid communication with said means for recirculation air.

14. The air filter assembly for attachment to an animal cage, of claim 13, wherein said means for recirculating air is an electric blower.

15. The air filter assembly for direct attachment to an animal cage of claim 13, wherein said means for recirculating air is a battery operated blower.

16. The air filter assembly for direct attachment to an animal cage of claim 13, wherein said means for movably mounting said housing to a cage is at least one hook adaptable to engage the support rods of the cage.

17. The air filter assembly for attachment to an animal cage of claim 13, wherein said removable means for filtering air comprises a filter cartridge containing at least one filter pad element removably disposed in said housing.

* * * * *